United States Patent [19]
Katoh

[11] Patent Number: 6,111,938
[45] Date of Patent: Aug. 29, 2000

[54] TELEPHONE ANSWERING MACHINE

[75] Inventor: Hideki Katoh, Sakurai, Japan

[73] Assignee: Sharp Kabushiki Kaisha, Osaka, Japan

[21] Appl. No.: 08/833,651

[22] Filed: Apr. 8, 1997

[30]    Foreign Application Priority Data

Apr. 8, 1996  [JP]  Japan .................................. 8-085564
  Jun. 5, 1996  [JP]  Japan .................................. 8-142709

[51] Int. Cl.⁷ ........................... H04M 1/64; H04M 15/00
[52] U.S. Cl. ................................. 379/88.21; 379/88.08;
              379/88.2; 379/114; 379/133; 379/67.1
[58] Field of Search ............................ 379/67.1, 70, 82,
              379/83, 88.01, 88.08, 88.09, 88.17, 88.2,
              88.21, 88.22, 88.23, 91.01, 93.12, 114,
              133

[56]          References Cited

U.S. PATENT DOCUMENTS

| | | | |
|---|---|---|---|
| 4,041,291 | 8/1977 | Pavda ........................................ | 235/156 |
| 4,122,308 | 10/1978 | Weinberger et al. ................... | 379/67.1 |
| 4,726,056 | 2/1988 | An et al. .................................. | 379/115 |
| 4,757,525 | 7/1988 | Matthews et al. ........................ | 379/88 |
| 4,959,852 | 9/1990 | Kern et al. ................................ | 379/70 |
| 5,003,584 | 3/1991 | Benyacar et al. ........................ | 379/119 |
| 5,400,393 | 3/1995 | Knuth et al. .............................. | 379/88 |

FOREIGN PATENT DOCUMENTS 487446  3/1992  Japan .
   66442  1/1994  Japan .

Primary Examiner—Fan S. Tsang
Assistant Examiner—Allan Hoosain

[57]          ABSTRACT

A telephone answering machine including a caller ID extracting part, a transmission period and reading part, a response message reading part and a central control part enables lower cost for the user by limiting the allowable time for a response message by operating the telephone answering machine in a more efficient manner. The caller ID extracting part analyzes a call incoming signal and extracts an area code as the caller ID information. The transmission period reading part reads the transmission period per unit cost that corresponds to the matching area code. The response message reading part reads a response message associated with the transmission period per unit cost. The central control part controls the processing and outputting of the response message of a voice recording from the caller or other operations such as remote operation use by the caller based on the caller ID. Depending on the location and/or telephone number of the calling party, the answering machine lowers user cost by limiting the allowable time for a response message and responding to incoming calls in a more efficient manner.

17 Claims, 21 Drawing Sheets

FIG. 2

| AREA CODE OF CALLER ID | TRANSMISSION PERIOD (PER ¥10) |
|---|---|
| 0742 | 180 SEC. |
| 07435 | 180 SEC. |
| : | |
| 07442 | 90 SEC. |
| 07444 | 90 SEC. |
| : | |
| 06 | 13 SEC. |
| 075 | 13 SEC. |
| : | |
| 092 | 10 SEC. |
| 03 | 10 SEC. |
| : | |

FIG. 3

| TRANSMISSION PERIOD (PER ¥10) | CODE | CONTENTS OF RESPONSE MESSAGES (STORED IN VOICE DATA MEMORY PART) |
|---|---|---|
| 180 SEC. OR MORE | 1 | I AM NOT AT HOME NOW. |
| FROM 120 SEC. TO LESS THAN 180 SEC. | 2 | I AM NOT AT HOME NOW. PLEASE LEAVE YOUR MESSAGE, IF ANY. |
| FROM 60 SEC. TO LESS THAN 120 SEC. | 3 | I AM NOT AT HOME NOW. MESSAGE, PLEASE. |
| LESS THAN 60 SEC. | 4 | LEAVE YOUR MESSAGE, PLEASE. |

FIG. 8

| CALLER ID | OPERATION CODE | OPERATION CONTENTS |
|---|---|---|
| 06-123-0001 | 1 | START REPRODUCING |
| 06-123-0005 | 1 | START REPRODUCING |
| 06-123-0002 | 2 | START RECORDING |
| 06-123-0003 | 2 | START RECORDING |
| 06-123-0004 | 3 | SHIFT TO REMOTE OPERATION MODE |
| 06-123-0006 | 3 | SHIFT TO REMOTE OPERATION MODE |

FIG. 9

| COMMANDS | OPERATIONS |
|---|---|
| 1# | START REPRODUCING |
| 2# | START RECORDING |
| 9# | STOP REPRODUCING AND RECORDING |

F I G. 1 3

| TRANSMISSION PERIOD (PER ¥10) | CODE | REPRODUCING SPEED |
|---|---|---|
| 180 SEC. OR MORE | 0 | REGULAR SPEED |
| FROM 120 SEC. TO LESS THAN 180 SEC. | 0 | REGULAR SPEED |
| FROM 60 SEC. TO LESS THAN 120 SEC. | 1 | DOUBLE SPEED |
| LESS THAN 60 SEC. | 1 | DOUBLE SPEED |

FIG. 14

| TRANSMISSION PERIOD (PER ¥10) | CODE | REPRODUCTION PERIOD |
|---|---|---|
| 180 SEC. OR MORE | 0 | REGULAR REPRODUCTION |
| FROM 120 SEC. TO LESS THAN 180 SEC. | 0 | REGULAR REPRODUCTION |
| FROM 60 SEC. TO LESS THAN 120 SEC. | 2 | REPRODUCE ONLY FOR INITIAL 5 SECONDS |
| LESS THAN 60 SEC. | 2 | REPRODUCE ONLY FOR INITIAL 5 SECONDS |

FIG. 15

| COMMANDS | OPERATIONS |
|---|---|
| 1# | START REPRODUCING |
| 2# | START RECORDING |
| 9# | STOP REPRODUCING AND RECORDING |

TELEPHONE ANSWERING MACHINE

BACKGROUND OF THE INVENTION

1. Field of the Invention

The present invention relates to a telephone answering machine.

2. Description of the Related Art

A conventional telephone answering machine which sends a response message responding to any caller in a constant method is widely known.

In addition, there is known a telephone answering machine which calculates a transmission period per unit call charge on the basis of an area code.

When a message is to be recorded from an external telephone machine such as a public telephone, in a telephone answering machine of the above-mentioned type, in general a response message is played before recording is accepted. However, when a caller does not have enough money to have a transmission period for recording the caller's message, the call is cut in the middle of the response message because of the insufficient depositing before the message is recorded.

Further, since the same message is played to any caller, when the caller records a message from a remote location, a call charge is wasteful.

A telephone machine disclosed in Japanese Unexamined Patent Publication JP-A 6-6442 (1994), for example, switches response messages depending on a caller. However, since the telephone machine does not switch the response messages upon consideration of a call charge, the caller is met by the same inconvenience as that described above.

Further, having received a DTMF signal from an external telephone machine, a conventional telephone answering machine of this type accepts recording of a caller's message or reproduction of a caller's message, or judges whether to execute various operations upon extracting and discriminating a caller's ID signal based on call incoming information.

However, a conventional telephone answering machine is structured to always provide constant answering operations, such as reproduction, to any caller whenever there is a remote control operation from outside. Hence, when a special operation is desired (i.e., an operation which matches with a caller's will), it is necessary to enter a secret identification number to specify a caller, which is inconvenient.

To reproduce a recorded message or otherwise operate the telephone answering machine by means of remote controlling, in particular, in addition to entry of a secret identification number, it is necessary to enter an operation command or the like, which is complex. In addition, when a caller operates the telephone answering machine from a remote location, not only the operation takes long time so that a call charge is wasteful, but also since a responding operation is provided always at a constant speed regardless of whether the caller is remotely controlling from a place far away or a place in the neighborhood, if the caller is operating from far away, the caller is charged an expensive rate for the call.

A telephone machine disclosed in Japanese Unexamined Patent Publication JP-A 4-87446 (1992), for example, allows messages from a plurality of telephone lines to be recorded separately on the respective telephone lines, and reproduces separately on the respective telephone lines, to thereby reduce charges for calls and secure privacy. However, the telephone machine nevertheless demands complex operations as those described above for recording, reproducing, etc.

SUMMARY OF THE INVENTION

Accordingly, an object of the invention is to provide for a telephone answering machine which reduces a charge for a call.

The invention provides a telephone answering machine comprising:

first memory means for storing caller ID information and transmission periods per unit call charge in correlation to each other;

second memory means for storing the transmission periods and response messages in correlation to each other in such a manner that the response messages become longer as the transmission periods are longer;

receiving means for receiving a call incoming signal from a telephone line network;

extracting means for analyzing the call incoming signal to extract caller ID information;

ID information checking means for checking the extracted caller ID information against the caller ID information stored in the first memory means;

transmission period reading means for reading a transmission period correlated with the caller ID information judged as matching on the basis of a checking result of the ID information checking means, from the first memory means;

transmission period checking means for checking the read transmission period against the transmission periods stored in the second memory means;

response message reading means for reading a response message correlated with the transmission period judged as matching on the basis of a checking result of the transmission period checking means, from the second memory means;

reproducing means for reproducing the read response message as a voice signal; and sending means for sending the voice signal to the telephone line network.

According to the invention, during an answering operation, while a short response message is preferred when a call is from a place far away, since the invention allows to change a response message at a calling area depending on a call charge, if the call is from a place far away, a short response message is played so that a transmission period is shortened and a call charge is reduced.

The invention is characterized by further comprising:

third memory means for storing a predetermined reference transmission period;

comparing means for comparing the transmission period read by the transmission period reading means with the reference transmission period stored in the third memory means; and controlling means for controlling the sending means, in accordance with a comparison result of the comparing means, to output a response message to the telephone line network when the transmission period read by the transmission period reading means is longer than the reference transmission period, and to output no response message to the telephone line network when the transmission period read by the transmission period reading means is shorter than the reference transmission period.

According to the invention, when recording is to be performed from a remote area for which a call charge is expensive, it is possible to set so that a response message is not sent out, and therefore, all of the call charge is used for recording, which is efficient. Further, it is possible to shorten a transmission period and reduce a call charge.

Alternatively, the invention is characterized by further comprising:
- third memory means for storing a predetermined reference transmission period;
- comparing means for comparing the transmission period read by the transmission period reading means with the reference transmission period stored in the third memory means; and
- controlling means for controlling the reproducing means, in accordance with a comparison result of the comparing means, to reproduce a response message into a voice signal at a predetermined reference speed and output the response message to the telephone line network when the transmission period read by the transmission period reading means is longer than the reference transmission period, and to reproduce a response message into a voice signal at a speed faster than the predetermined reference speed and output the response message to the telephone line network when the transmission period read by the transmission period reading means is shorter than the reference transmission period.

According to the invention, when recording is to be performed from a remote area for which a call charge is expensive, it is possible to reproduce a response message and send the response message at a fast speed, and therefore, it is possible to record efficiently. Further, it is possible to shorten a transmission period and reduce a call charge.

Furthermore the invention provides a telephone answering machine in which a voice signal inputted from a telephone line network is recorded by voice recording means as a caller's message from the caller and is stored in voice information memory means, and a response message stored in advance in the voice information memory means is reproduced by voice reproducing means into a voice signal and outputted to the telephone line network, the telephone answering machine comprising:
- memory means for storing ID select conditions and operation codes in correlation to each other,
  - the ID select conditions being correlated with caller ID information,
  - the operation codes representing a recording operation and a reproducing operation which are executed by the telephone answering machine;
- receiving means for receiving a call incoming signal from the telephone line network;
- extracting means for analyzing the call incoming signal and extracting caller ID information;
- ID information checking means for checking the extracted caller ID information against the caller ID information stored in the memory means;
- operation code reading means for reading an operation code associated with an ID select condition correlated with the caller ID information judged as matching on the basis of a checking result of the ID information checking means, from the memory means; and
- controlling means for causing the voice recording means and the voice reproducing means to execute an operation corresponding to the read operation code.

In such a structure according to the invention, when caller ID information supplied from a caller matches an ID select condition stored in the memory means, the voice reproducing means and the voice recording means execute the operation of an operation code correlated with the ID select condition judged as matching.

As a result, the telephone answering machine carries out an operation suitable to a caller ID, i.e., the caller. Hence, even in a condition where a person who is not knowledgeable about an operation method or a complex operation is required, it is possible to provide an appropriate service.

Furthermore, the invention is characterized in that operation codes associated with ID select conditions include operation codes for instructing a remote control mode.

In such a structure according to the invention, when a caller ID representing the remote control mode supplied by a caller matches an ID select condition stored in the memory means, the voice reproducing means and the voice recording means operate in the remote control mode which corresponds to the ID select condition judged as matching.

As a result, in case of calling from a preset caller, setting the answering machine to automatically reproduce a recorded caller's message which is not reproduced yet, eliminates an operation of entering a secret identification number or an operation command, which improves the operability.

Moreover, it is heretofore impossible to listen to a replay and the like from a telephone machine which is not capable of sending a DTMF signal during remote controlling, however in case where a telephone answering machine is set to automatically reproduce a recorded message, it is possible to listen to a replay and the like from a telephone answering machine if ID select conditions are set in advance in the telephone answering machine. Further, since the operability is improved, it is possible to shorten a transmission period and reduce a telephone charge.

Furthermore the invention provides a telephone answering machine in which a response message stored in advance in voice information memory means is reproduced into a voice signal by voice reproducing means, and outputted to a telephone line network, the telephone answering machine comprising:
- first memory means for storing ID select conditions associated with caller ID information and transmission periods per unit call charge in correlation to each other;
- second memory means for storing said transmission periods and reproduction speed control codes representing reproduction speeds for reproducing response messages, in correlation to each other;
- receiving means for receiving a call incoming signal and a DTMF signal from the telephone line network;
- extracting means for analyzing said call incoming signal and extracting caller ID information;
- ID information checking means for checking the extracted caller ID information against the caller ID information stored in said first memory means;
- transmission period reading means for reading out a transmission period correlated with the caller ID information judged as matching on the basis of a checking result of the ID information checking means, from said first memory means;
- transmission period checking means for checking the read transmission period against the transmission periods stored in the second memory means;
- reproduction speed control code reading means for reading a reproduction speed control code correlated with the transmission period judged as matching on the basis of a checking result of the transmission period checking means, from the second memory means; and controlling means for driving the voice reproducing means to reproduce a response message as a voice signal at a speed corresponding to the read reproduction speed control code.

In such a structure according to the invention, the voice reproducing means is driven by a reproduction speed control code correlated with a transmission period per unit charge which is associated with a caller ID, so that voice data are read from the voice information memory means.

As a result, since it is possible to change a reproduction speed in accordance with areas for which different call rates are set, when one reproduces through remote controlling from a remote location for which a call rate is expensive, for instance, it is possible to set in such a manner that a caller's message is reproduced at a speed which is faster than a regular reproduction speed (e.g., at a double speed). This shortens a transmission period and reduces a call charge.

Furthermore the invention provides a telephone answering machine in which a response message stored in advance in voice information memory means is reproduced as a voice signal by voice reproducing means, and is outputted to a telephone line network, the telephone answering machine comprising:

first memory means for storing ID select conditions associated with caller ID information and transmission periods per unit call charge in correlation to each other;

second memory means for storing the transmission periods and reproduction period control codes representing reproduction periods for reproducing response messages, in correlation to each other;

receiving means for receiving a call incoming signal and a DTMF signal from the telephone line network;

extracting means for analyzing the call incoming signal and extracting caller ID information;

ID information checking means for checking the extracted caller ID information against the caller ID information stored in the first memory means;

transmission period reading means for reading a transmission period correlated with the caller ID information judged as matching on the basis of a checking result of the ID information checking means, from the first memory means;

transmission period checking means for checking the read transmission period against the transmission periods stored in the second memory means;

reproduction period control code reading means for reading a reproduction period control code correlated with the transmission period judged as matching on the basis of a checking result of the transmission period checking means, from the second memory means; and controlling means for driving the voice reproducing means to reproduce a response message as a voice signal for a period of time according to the read reproduction period control code.

In such a structure according to the invention, the voice reproducing means is driven by a reproduction period control code correlated with a transmission period per unit charge which associated with a caller ID, so that voice data are read from the voice information memory means.

As a result, since it is possible to change a reproduction period in accordance with areas for which different call rates are set, when one reproduces through remote controlling from a remote location for which a call rate is expensive, for instance, it is possible to set in such a manner that each caller's message is reproduced only for a constant initial time period (e.g., for five seconds). This shortens a transmission period and reduces a call charge.

BRIEF DESCRIPTION OF THE DRAWINGS

Other and further objects, features, and advantages of the invention will be more explicit from the following detailed description taken with reference to the drawings wherein:

FIG. 2 is a view showing a transmission period table 50 of a transmission period memory part 11 of the telephone answering machine 15;

FIG. 3 is a view showing a response message table 51 of a response message memory part 12a of the telephone answering machine 15;

FIG. 8 is a view showing an operation code table 52 of an ID memory part 22 of the telephone answering machine 21;

FIG. 9 is a view showing the relationship between command signals 29 and operation contents 30 of the same;

FIG. 13 is a view showing a reproduction speed table 32 of a reproduction control code memory part 12b of the telephone answering machine 31;

FIG. 14 is a view showing a reproduction period table 36 of a reproduction control code memory part 12b of the telephone answering machine 31;

FIG. 15 is a view showing the relationship between command signals 40 and operation contents 41 of the same;

DETAILED DESCRIPTION OF THE PREFERRED EMBODIMENTS

Figure 1:
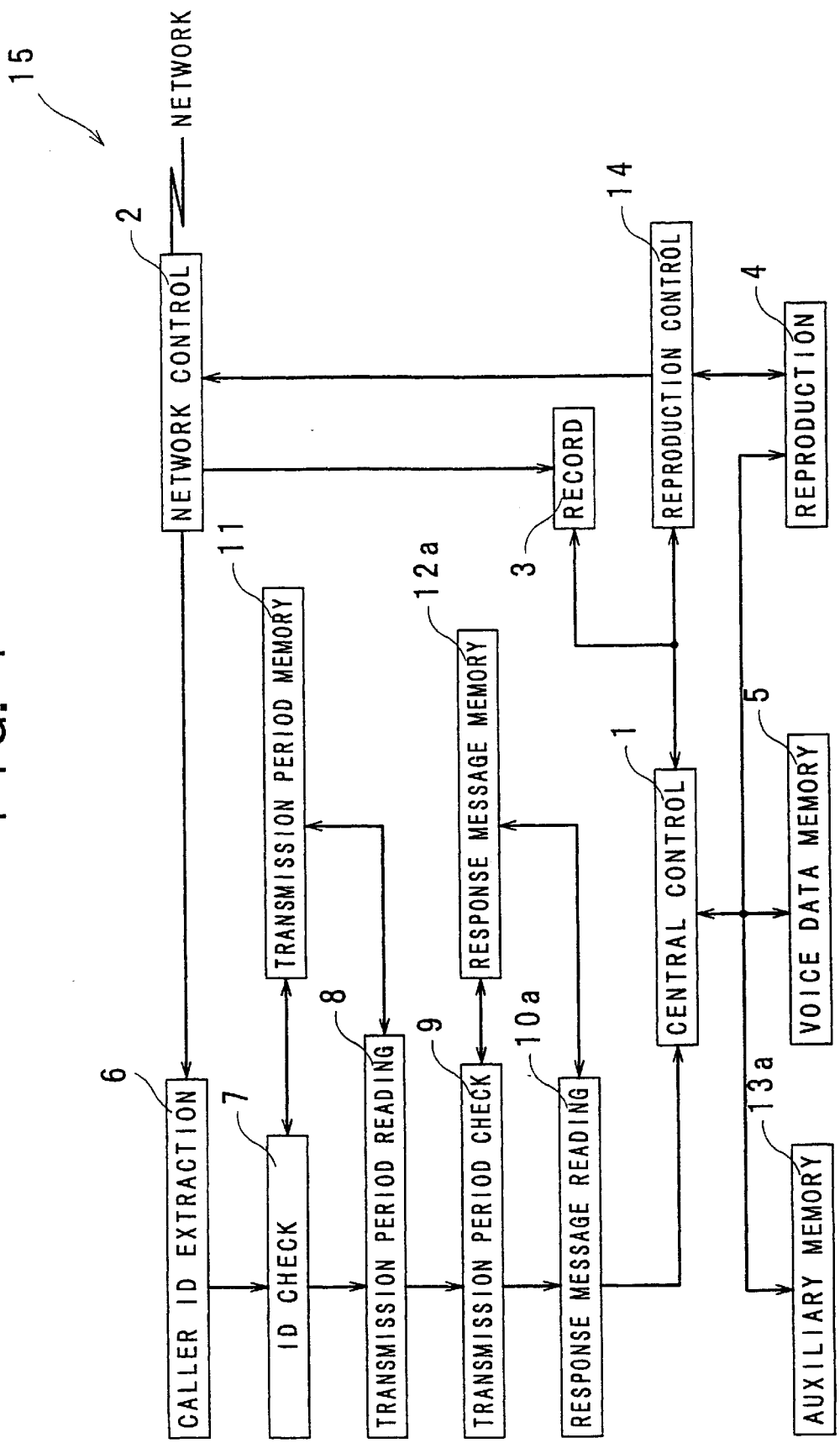
FIG. 1 is a block diagram showing an electric structure of a telephone answering machine 15 of a first embodiment of the invention.

Now referring to the drawings, preferred embodiments of the invention are described below.

FIG. 1 is a block diagram showing an electric structure of a telephone answering machine 15 of a first embodiment of the invention. The telephone answering machine 15 comprises a central control part 1, a network control part 2, a recording part 3, a reproducing part 4, a voice data memory part 5, a caller ID extracting part 6, an ID checking part 7, a transmission period reading part 8, a transmission period checking part 9, a response message reading part 10a, a transmission period memory part 11, a response message memory part 12a, an auxiliary memory part 13a, and a reproduction control part 14.

The central control part 1 is realized by a CPU (Central Processing Unit), for instance, and controls overall operations of the telephone answering machine 15. The network control part 2 controls transmission of various signals from the telephone answering machine 15 to a telephone line network and transmission of various signals from the telephone line network to the telephone answering machine 15. For example, a voice signal from the telephone line network is supplied to the recording part 3, a call incoming signal from the telephone line network is supplied to the caller ID extracting part 6, and voice signals such as voice data or a response message, for which reproduction conditions such as a reproduction speed are controlled by the reproduction control part 14 are supplied to the telephone line network.

The recording part 3 converts an inputted voice signal into voice data. The voice data are stored in the voice data memory part 5 through the central control part 1. The reproducing part 4 converts the voice data or response message which are stored in the voice data memory part 5 into voice signals. After controlled for a reproduction condition by the reproduction control part 14, the voice signal is supplied to the network control part 2.

The caller ID extracting part 6 analyzes a received call incoming signal and extracts ID information regarding a caller. The ID information contains a caller's area code. The ID checking part 7 checks ID information extracted by the caller ID extracting part 6 against ID information stored in the transmission period memory part 11. The transmission period memory part 11 stores an area code and a transmission period per unit charge in correlation to each other. The ID checking part 7 specifically compares and checks an area code. The transmission period reading part 8 reads a transmission period correlated with the area code judged as matching on the basis of a checking result of the ID checking part 7, from the transmission period memory part 11.

The transmission period checking part 9 compares and checks a transmission period which is read by the transmission period reading part 8 with and against transmission periods which are stored in the response message memory part 12a. The response message memory part 12a stores response messages in correlation with transmission periods. In this embodiment, response messages and fetch codes for fetching the response messages are stored in correlation with transmission periods. The response message reading part 10a reads a response message which is correlated with a transmission period judged as matching on the basis of a checking result of the transmission period checking part 9, from the response message memory part 12a. In this embodiment, the fetch codes are read. A read fetch code is supplied to the central control part 1. A response message associated with the fetch code supplied to the central control part 1 is fetched from the voice data memory part 5, converted into a voice signal by the reproducing part 4, and controlled for a reproduction condition by the reproduction control part 14, and supplied to the network control part 2.

The auxiliary memory part 13a stores various registered contents which are needed for actuating the telephone answering machine 15.

FIG. 2 is a view showing a transmission period table 50 of the transmission period memory part 11. The transmission period table 50 of the transmission period memory part 11 is structured to store a plurality of area codes 16 and transmission periods 17 in correlation to each other. The transmission periods 17 are each a period of time per unit charge, such as 10 Japanese yen, during which communication is possible. The area codes 16 are correlated with the transmission periods 17 in such a manner, for example, that the area code "0742" among the area codes 16 is correlated with the transmission period 17 of "180 seconds" while the area code "07435" among the area codes 16 is correlated with the transmission period 17 of "180 seconds."

FIG. 3 is a view showing a response message table 51 of the response message memory part 12a. The response message table 51 of the response message memory part 12a is structured to store a plurality of transmission periods 18, response messages 20 and fetch codes 19 in correlation to each other. The transmission periods 18 are each a period of time per unit charge during which communication is possible. For example, a response message 20 and a corresponding fetch code 19, i.e., "1" are correlated with the transmission period 18 of "180 seconds or longer," a response message 20 and a corresponding fetch code 19, i.e., "2" are correlated with the transmission period 18 of "from 120 seconds to less than 180 seconds," a response message 20 and a corresponding fetch code 19, i.e., "3" are correlated with the transmission period 18 of "from 60 seconds to less than 120 seconds," and a response message 20 and a corresponding fetch code 19, i.e., "4" are correlated with the transmission period 18 of "less than 60 seconds." That is, the longer the transmission period 18 is, the longer the response message 20 is.

Figure 4:
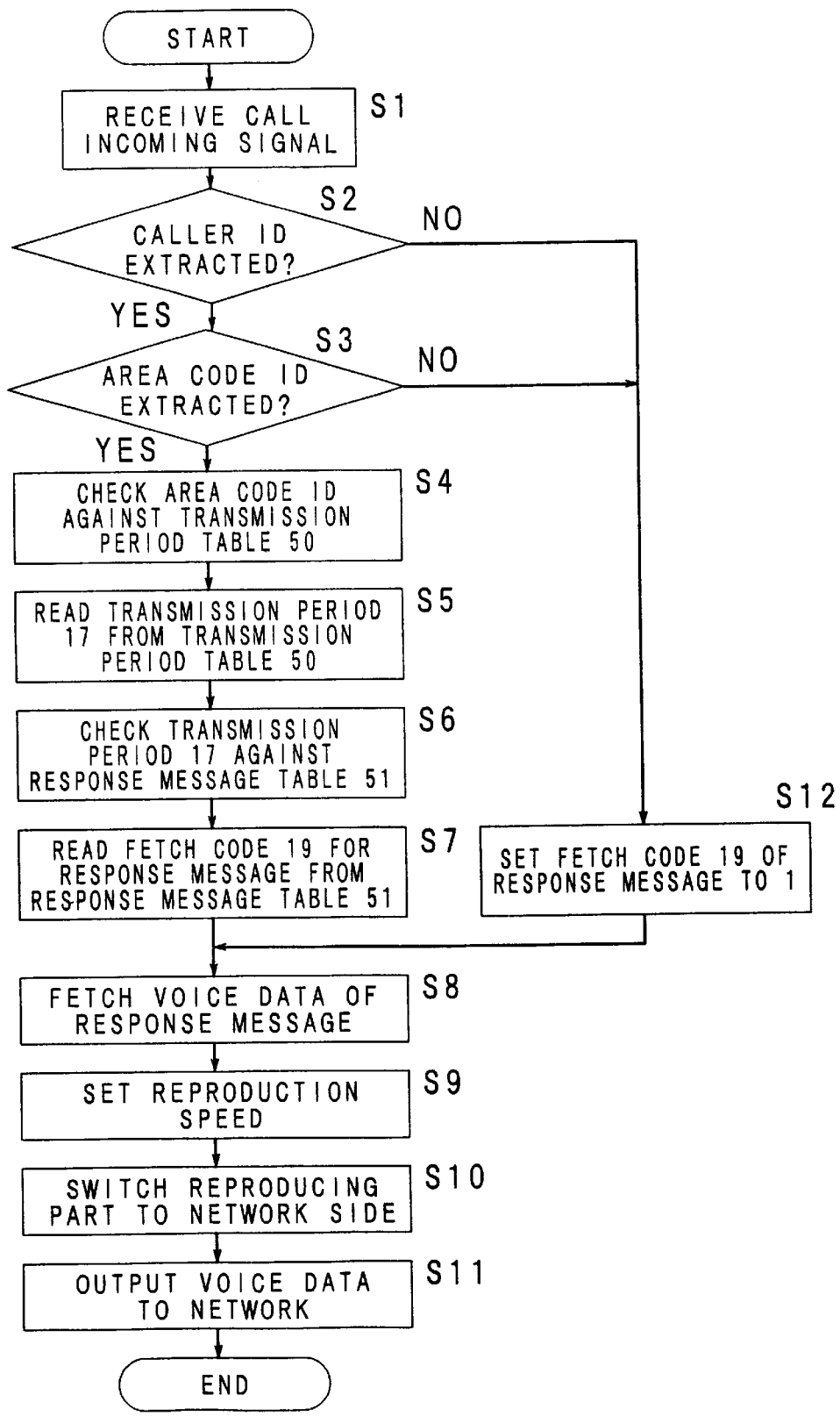
FIG. 4 is a flow chart showing sending of a response message performed by the telephone answering machine 15.

FIG. 4 is a flow chart showing sending of a response message of the telephone answering machine 15. At step S1, a call incoming signal is received. At step S2, the caller ID extracting part 6 analyzes the received call incoming signal and determines whether ID information regarding a caller is extracted. When the ID information is judged as being extracted, at step S3 the caller ID extracting part 6 further determines whether a caller's area code is extracted. When the caller's area code is judged as being extracted, the sequence proceeds to step S4. When at the precedent step S2 the ID information is judged as not being extracted, or when at step S3 the caller's area code is judged as not being extracted, the sequence proceeds to step S12.

At step S4, the ID checking part 7 checks the extracted caller's area code against the area codes 16 of the transmission period table 50 of the transmission period memory part 11. At step S5, the transmission period reading part 8 reads the transmission period 17 which corresponds to the area code 16 judged as matching on the basis of a result of the ID checking part 7.

At step S6, the transmission period checking part 9 checks the transmission period 17 which is read by the transmission period reading part 8 against the transmission periods 18 of the response message table 51 of the response message memory part 12a. At step S7, the response message reading part 10a reads a fetch code 19 of a response message 20 which corresponds to the transmission period 18 judged as matching on the basis of a result of the transmission period checking part 9. The fetch code 19 which is read is supplied to the central control part 1.

At step S8, the central control part 1 retrieves the response message 20 which corresponds to the received fetch code 19, from the voice data memory part 5. For instance, when "1"

is supplied as the fetch code 19, the response message 20 speaking, "I am not at home now. Please leave your message, if any." is fetched.

At step S9, the central control part 1 sets a reproduction condition, such as a reproduction speed for reproducing the response message 20, to the reproduction control part 14. For example, "0" which is an initial set value for reproducing at a predetermined speed is set.

At step S10, setting which requires to supply an output from the reproducing part 4 to the telephone line network is provided. At step S11, the fetched response message 20 is converted into a voice signal by the reproducing part 4, controlled for a reproduction condition by the reproduction control part 14, and supplied to the telephone line network, thereby completing the sequence.

At step S12, as a fetch code 19 for a predetermined response message 20, for instance, "1" is read and supplied to the central control part 1. The sequence thereafter proceeds to step S8.

As described above, according to the first embodiment, a relatively long response message is sent when a transmission period per unit charge is long, while a relatively short response message is sent when a transmission period per unit charge is short. Hence, it is possible to shorten a transmission period and reduce a call charge.

Figure 5:
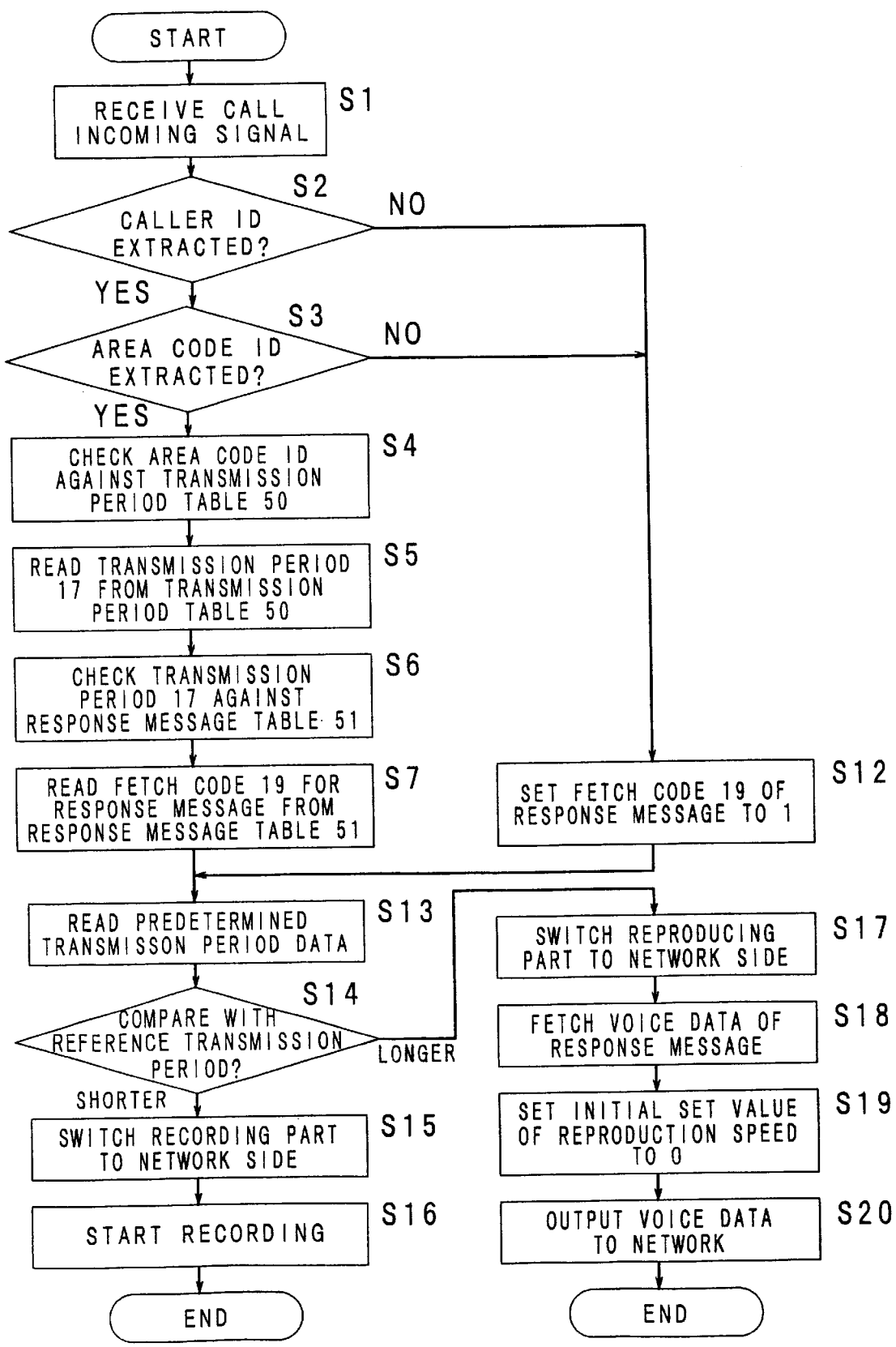
FIG. 5 is a flow chart showing sending of a response message performed by a telephone answering machine of a second embodiment of the invention.

Next, a telephone answering machine of a second embodiment of the invention will be described. The telephone answering machine according to the second embodiment is structured like the telephone answering machine 15 according to the first embodiment, but is characterized in requiring a different operation to send a response message. FIG. 5 is a flow chart showing sending of a response message of the telephone answering machine of the second embodiment. The flow chart adds steps S13 to S20 to the steps S1 to S7 and S12 of the flow chart in FIG. 4 regarding the telephone answering machine 15. The auxiliary memory part 13a stores a predetermined reference transmission period.

At step S5 which is followed upon similar operations as those at the steps S1 to S4, the transmission period reading part 8 reads and temporarily stores the transmission period 17 which corresponds to the area code 16 judged as matching on the basis of a checking result of the ID checking part 7.

Further, at step S13 which is followed upon similar operations as those at the steps S6, S7 and S12, the reference transmission period which is stored in advance in the auxiliary memory part 13a and the temporary transmission period which is temporarily stored at step S5 are read. At step S14, the reference transmission period is compared with the temporary transmission period. If the temporary transmission period is shorter than the reference transmission period, the sequence proceeds to step S15. If the temporary transmission period is longer than the reference transmission period, the sequence proceeds to step S17.

At step S15, the recording part 3 is connected to the telephone line network. At step S16, recording is started and the sequence is ended. At step S17, the reproducing part 4 is connected to the telephone line network. At step S18, the central control part 1 retrieves the response message 20 which corresponds to the received fetch code 19, from the voice data memory part 5.

At step S19, the central control part 1 sets a reproduction condition, such as a reproduction speed for reproducing the response message 20, to the reproduction control part 14. For example, "0" which is an initial set value for reproducing at a predetermined speed is set. At step S20, the fetched response message 20 is converted into a voice signal by the reproducing part 4, controlled for a reproduction condition by the reproduction control part 14, and supplied to the telephone line network, thereby completing the operation.

As described above, according to the second embodiment, a response message is sent when a transmission period per unit charge is long, but is not sent when a transmission period per unit charge is short. Hence, it is possible to shorten a transmission period and reduce a call charge.

Figure 6:
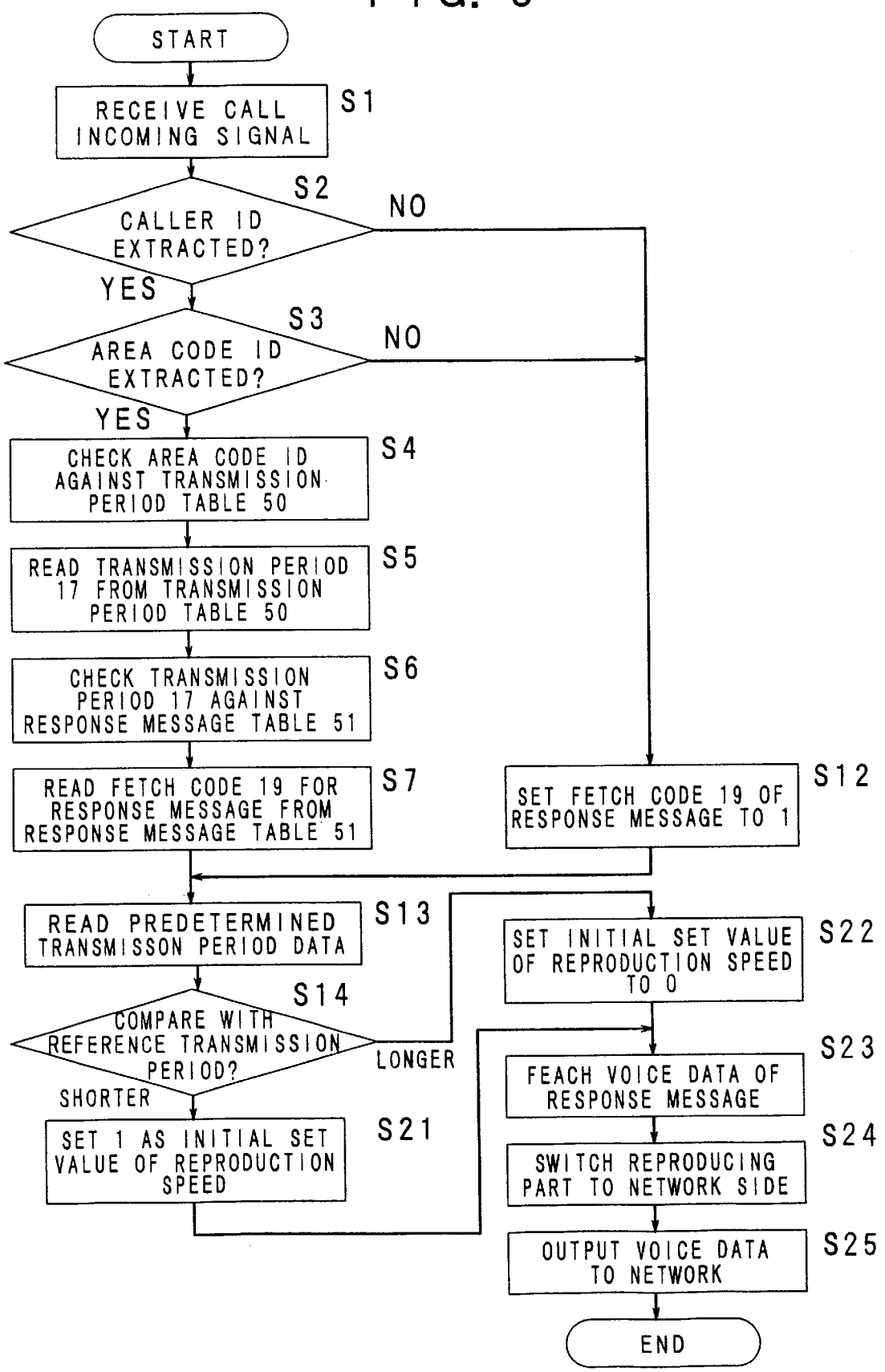
FIG. 6 is a flow chart showing sending of a response message performed by a telephone answering machine of a third embodiment of the invention.

Next, a telephone answering machine according to a third embodiment of the invention will be described. The telephone answering machine according to the preferred embodiment is also structured like the telephone answering machine 15 according to the first preferred embodiment, but is characterized in requiring a different operation to send a response message. FIG. 6 is a flow chart showing sending of a response message of the telephone answering machine of the third embodiment. The flow chart adds steps S21 to S25 to the steps S1 to S7 and S12 to S14 of the flow chart in FIG. 5 regarding the telephone answering machine of the second embodiment. The auxiliary memory part 13a stores a predetermined reference transmission period.

As in the second embodiment, at step S14 which is followed upon the operations at the steps S1 to S7, S12, S13, the reference transmission period is compared with the temporary transmission period. If the temporary transmission period is shorter than the reference transmission period, the sequence proceeds to step S21. If the temporary transmission period is longer than the reference transmission period, the sequence proceeds to step S22. At step S21, "1" is set to quicken a regular predetermined speed twice faster than a reproduction speed. At step S22, "0" is set to use the regular predetermined speed as a reproduction speed.

At step S23 which is followed upon the operations at the steps S21, S22, the central control part 1 retrieves the response message 20 which corresponds to the received fetch code 19, from the voice data memory part 5. At step S24, the reproducing part 4 is connected to the telephone line network. At step S25, the fetched response message 20 is converted into a voice signal by the reproducing part 4, controlled for a reproduction condition by the reproduction control part 14, and outputted to the telephone line network.

As described above, according to the third embodiment, a reproduced response message is sent at the regular speed when a transmission period per unit charge is long, while the reproduced response message is sent at the speed which is twice faster than the regular speed when a transmission period per unit charge is short. Hence, it is possible to shorten a transmission period and reduce a call charge.

The reproduction speed for reproducing a response message for a short transmission period per unit charge is not limited to the speed which is twice faster than the regular speed, but rather may be any other speed which is faster than the regular speed.

Figure 7:
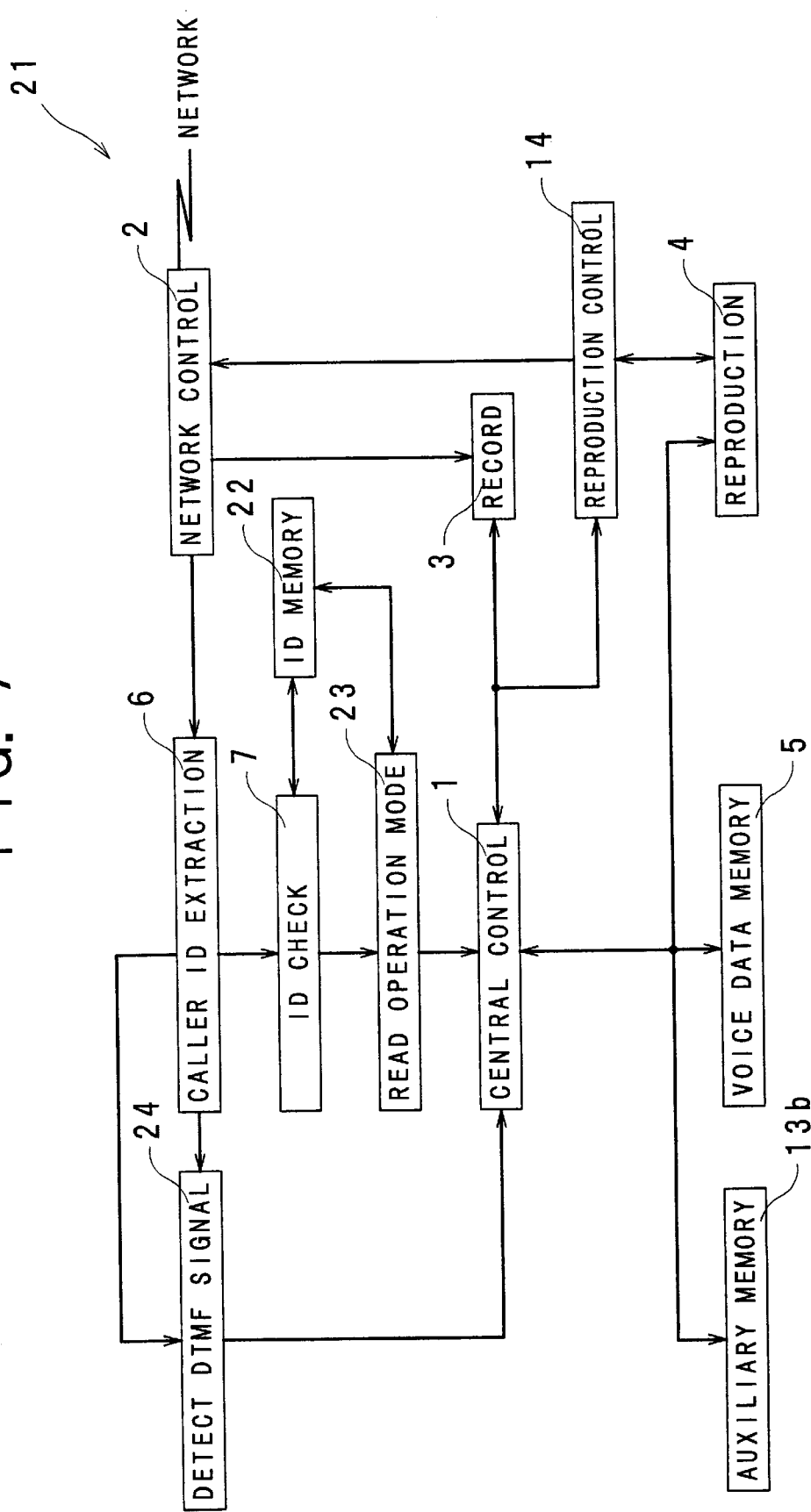
FIG. 7 is a block diagram showing an electric structure of a telephone answering machine 21 of a fourth embodiment of the invention.

FIG. 7 is a block diagram showing an electric structure of a telephone answering machine 21 of a fourth embodiment of the invention. The telephone answering machine 21 comprises an ID memory part 22, an operation mode reading part 23, a DTMF signal detecting part 24 and an auxiliary memory part 13b, in addition to the central control part 1, the network control part 2, the recording part 3, the reproducing part 4, the voice data memory part 5, the caller ID extracting part 6, the ID checking part 7 and the reproduction control part 14 of the telephone answering machine 15.

The network control part 2 supplies a voice signal from a telephone line network to the recording part 3, while supplying a call incoming signal to the caller ID extracting part 6 and a DTMF signal to the DTMF signal detecting part 24.

The caller ID extracting part 6 analyzes a received call incoming signal and extracts ID information regarding a caller. The ID information is information which contains ID select conditions, such as a telephone number of a caller, for example. The ID checking part 7 checks ID information which is extracted by the caller ID extracting part 6 against ID information which is stored in the ID memory part 22. The ID checking part 7 specifically compares and checks a telephone number of a caller which is an ID select condition. The ID memory part 22 stores operation codes representing operation contents which are to be performed by the telephone answering machine 21, in correlation with ID select conditions regarding callers. The operation mode reading part 23 reads an operation code correlated with an ID select condition judged as matching on the basis of a checking result of the ID checking part 7. The operation code which is read is supplied to the central control part 1. The central control part 1 executes operation contents of the received operation code.

The auxiliary memory part 13b stores various registered contents which are needed for actuating the telephone answering machine 21. The central control part 1 reads the operation contents of the received operation code from the auxiliary memory part 13b and executes the operation contents.

FIG. 8 is a view showing an operation code table 52 of the ID memory part 22. The operation code table 52 of the ID memory part 22 is structured to store a plurality of ID select conditions 26 regarding callers, in correlation with operation codes 27 representing operation contents 28. The ID select conditions 26 are telephone numbers of callers. For instance, the ID select conditions 26 and the operation codes 27 are correlated with each other in such a manner, that a telephone number reading "06-123-0001" among the ID select conditions 26 is correlated with the operation code 27 of "1" representing the operation content 28 while a telephone number reading "06-123-0002" among the ID select conditions 26 is correlated with the operation code 27 of "2" representing the operation content 28.

FIG. 9 is a view showing the relationship between command signals 29, which designate operations which are to be performed after a specific operation, such as inputting of a secret identification number by means of the DTMF signal, while the telephone answering machine 21 is automatically responding to a call on the telephone line network, and a corresponding operation content 30. For example, the first command 29 of "1#" is correlated with the operation content 30 for "START REPRODUCING," the second command 29 of "2#" is correlated with the operation content 30 for "START RECORDING," and the ninth command 29 of "9#" is correlated with the operation content 30 for "STOP REPRODUCING AND RECORDING." The third command 29 is correlated with an operation content for "SHIFT TO REMOTE OPERATION MODE."

Figure 10:
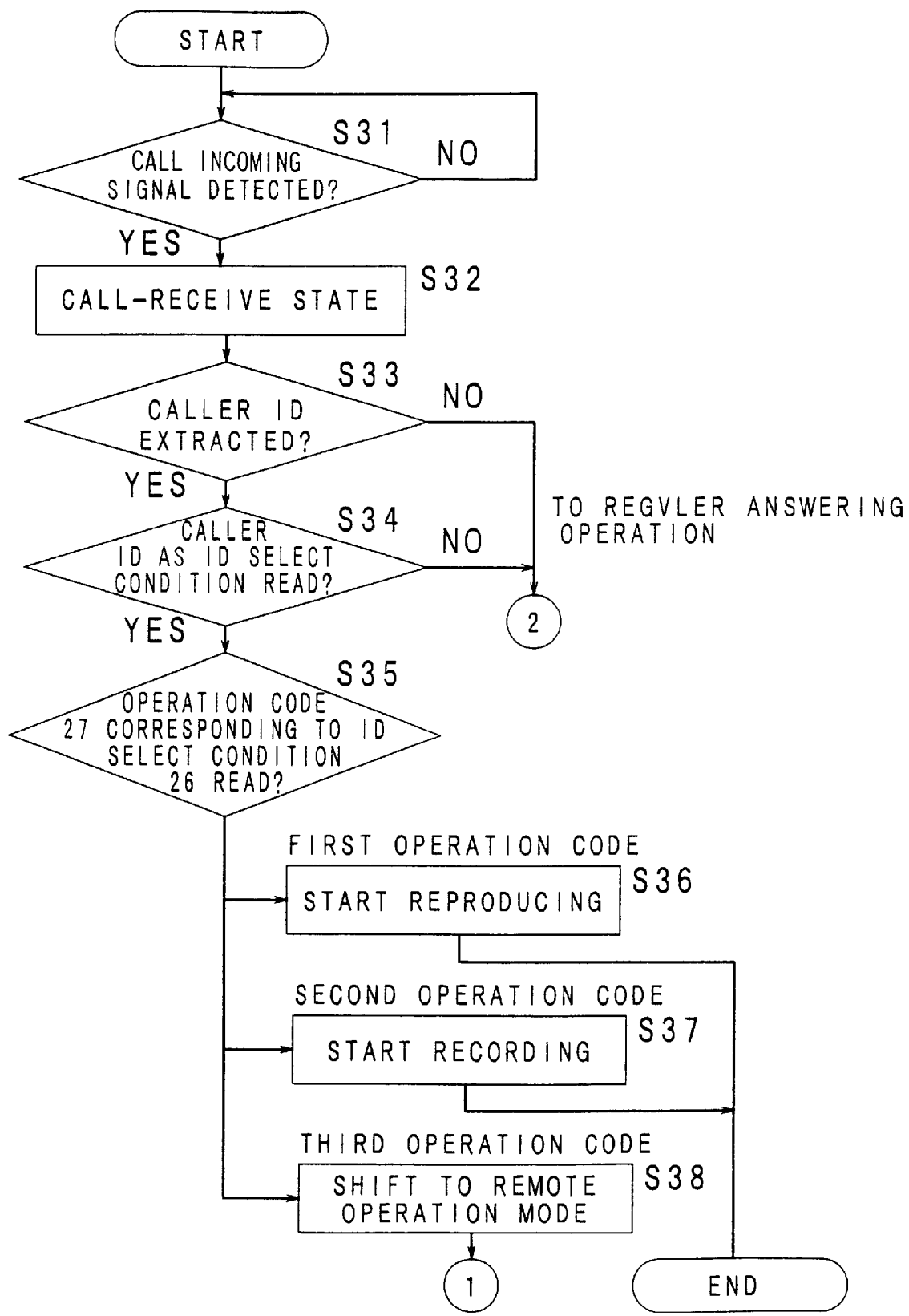
FIG. 10 is a flow chart showing response operations of the telephone answering machine 21.
Figure 11:
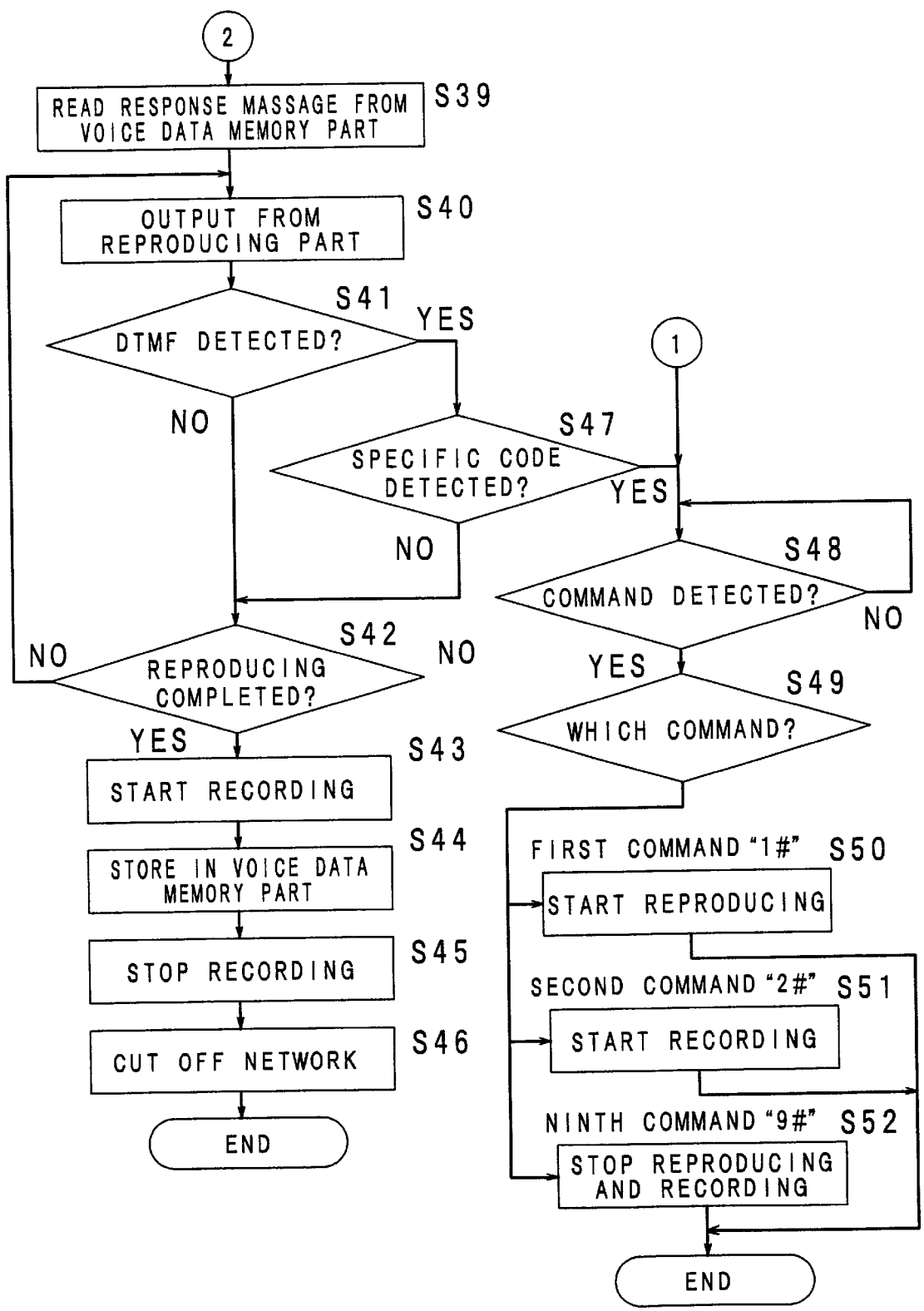
FIG. 11 is a flow chart showing response operations of the telephone answering machine 21.

FIGS. 10 and 11 are flow charts showing responding performed by the telephone answering machine 21. At step S31, whether the network control part 2 detects a call incoming signal is detected is judged. When the call incoming signal is judged as being detected, at step s32 the telephone answering machine 21 enters a call-receive condition.

At step S33, the caller ID extracting part 6 analyzes the received call incoming signal and determines whether ID information regarding a caller is extracted. When the ID information is judged as being extracted, at step S35 the caller ID extracting part 6 further determines whether the ID information is read with an ID select condition regarding the caller, i.e., the telephone number of the caller.

When the ID select condition is judged as being read, at step S35 the ID checking part 7 checks the extracted ID select condition regarding the caller against the ID select conditions 26 which are stored in the operation code table 52 of the ID memory part 22, and judges whether the operation code 27 which corresponds to the ID select condition 26 judged as matching is read. For instance, if the ID select condition is "06-123-0001," "1" is read as the operation code 27 and this operation code 27 is supplied to the central control part 1.

More specifically, if the operation code is "1," the sequence proceeds to step S36, to thereby start a reproduction operation and end the sequence. In other words, the reproducing part 4 reads voice data from the voice data memory part 5, converts the voice data into a voice signal, and sends the voice signal to the telephone line network, through the network control part 2, at a reproduction condition which is set in the reproduction control part 14.

Meanwhile, if the operation code is "2," the sequence proceeds to step S37, to thereby start a recording operation and end the sequence. In other words, the recording part 3 converts a voice signal which is inputted through the network control part 2 on the telephone line network into voice data, and supplies the voice data to the voice data memory part 5. Further, if the operation code is "3," the sequence proceeds to step S38, to thereby shift to a remote operation mode.

When at the precedent step S33 the ID information is judged as not being extracted, or when at step S34 the ID select condition is judged as not being read, the sequence proceeds to step S39 in order to execute a regular answering operation for recording. At step S39, a predetermined response message is read from the voice data memory part 5. For example, a response message speaking, "I am not at home now. Please leave a message after the beep." is read. At step S40, the reproducing part 4 converts the read response message into a voice signal and outputs the voice signal to the telephone line network, through the network control part 2, at a reproduction condition which is set in the reproduction control part 14.

At step S41, before reproduction of the response message above is completed, the DTMF signal detecting part 24 judges whether a DTMF signal, which is inputted on the telephone line network through the network control part 2, is detected. If the DTMF signal is judged as being detected, the sequence proceeds to step S47, whereby the detected DTMF signal is encoded and supplied to the central control part 1, and whether the encoded signal is a predetermined code is judged. When the encoded signal is judged as being the predetermined code, the sequence proceeds to step S48 to thereby shift to the remote operation mode.

When at the precedent step S41 the DTMF signal is judged as not being detected or when at the precedent step S47 the encoded signal is judged as not being the predetermined code, whether reproduction of the response message is completed is judged at step S42. When the reproduction is judged as being completed, the sequence proceeds to step S43. Otherwise, the sequence returns to step S40.

At step S43, a recording operation is started. At step S44, voice data are stored in the voice data memory part 5. That is, voice signals which are inputted on the telephone line network through the network control part 2 are sequentially converted into voice data by the recording part 3 and sequentially stored in the voice data memory part 5. At step S45, the recording operation is stopped. At step S46, the telephone line network is cut off to end the sequence.

When "3" is read as the operation code at step S38 to enter the remote operation mode, and at step S48 which is followed when the specific code is detected and the remote operation mode has been invoked at the precedent step S47, whether the command signal 29 is detected is judged, When the command signal 29 is judged as having been detected, at step S49 the type of the detected command signal 29 is judged.

When the command signal 29 is judged as being a first command signal of "1#," the sequence proceeds to step S50, whereby a reproduction operation which is similar to that of step S36 is started and the sequence is ended. When the command signal 29 is judged as being a second command signal of "2#," the sequence proceeds to step S51, whereby a recording operation which is similar to that of step S37 is started and the sequence is ended. When the command signal 29 is judged as being a ninth command signal of "9#," the sequence proceeds to step S52, whereby if a reproduction operation is being executed, the reproduction operation is stopped, or if a recording operation is being executed, the recording operation is stopped, and the network control part 2 is thereafter actuated to cut off the telephone line network and end the communication.

As described above, according to the fourth embodiment, the telephone answering machine 21 can automatically carry out an operation which is suitable for a caller. Hence, the caller does not have to perform complex operations which are necessary to manipulate the telephone answering machine 21, which remarkably improves the operability.

Figure 12:
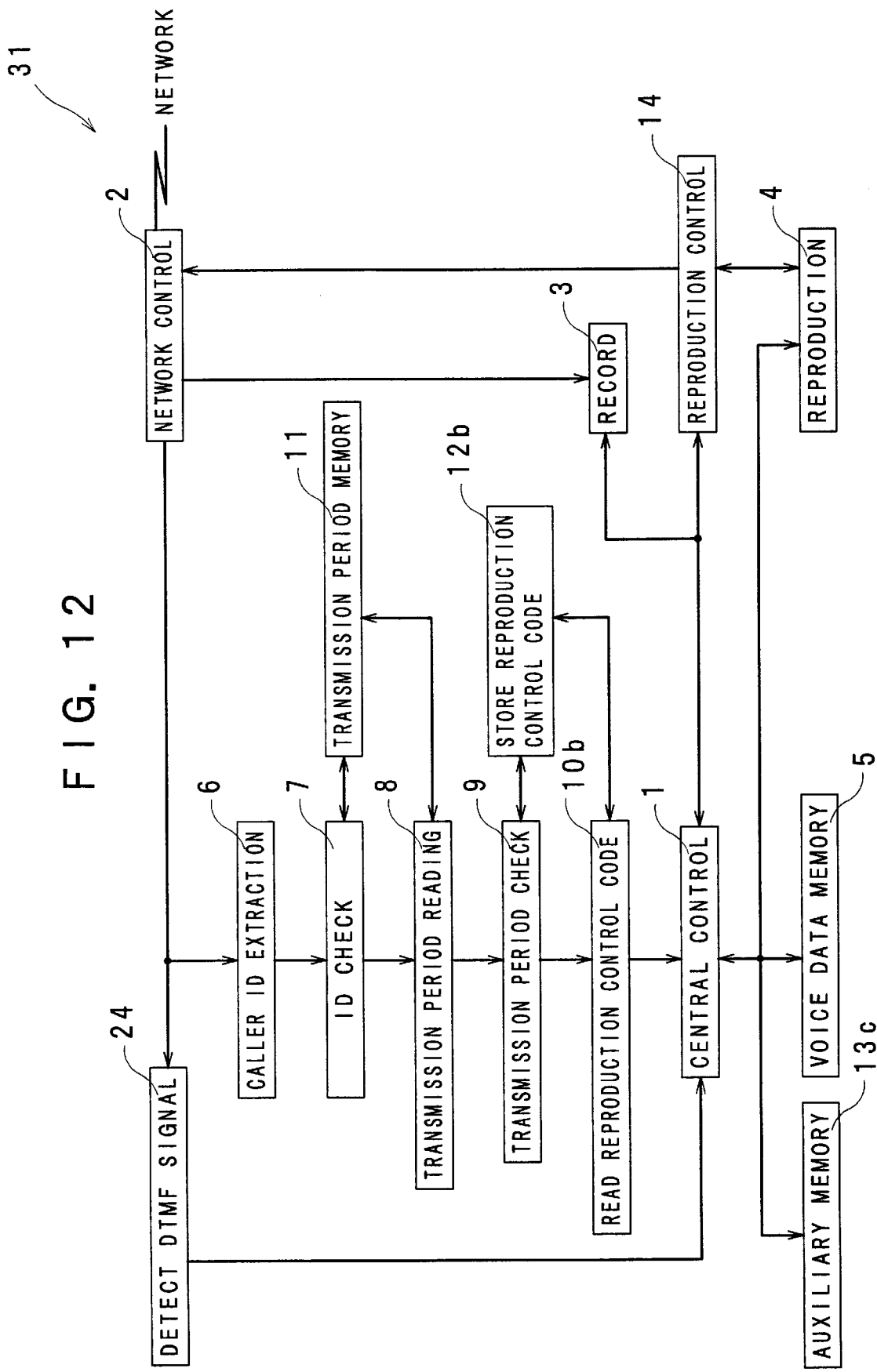
FIG. 12 is a block diagram showing the electric structure of a telephone answering machine 31 of a fifth embodiment of the invention.

FIG. 12 is a block diagram showing an electric structure of a telephone answering machine 31 of a fifth embodiment of the invention. The telephone answering machine 31 is approximately similar in structure to the telephone answering machine 15 according to the first embodiment, but is characterized in that a reproduction control code reading part 10b is disposed in place of the response message reading part 10a, a reproduction control code memory part 12b is disposed in place of the response message memory part 12a, an auxiliary memory part 13c is disposed in place of the auxiliary memory part 13a, and that the DTMF signal detecting part 24 is further disposed.

FIGS. 13 and 14 show tables 32 and 36, respectively, of the reproduction control code memory part 12b. The reproduction control code memory part 12b includes the reproduction speed table 32 as that shown in FIG. 13, for example. The reproduction speed table 32 is structured to store a plurality of transmission periods 33, in correlation with operation codes 34 representing reproduction speeds 35. The transmission periods 33 are each a period of time per unit charge during which communication is possible. For example, "0" is correlated as the operation code 34 which indicates to reproduce at a regular speed with the transmission periods 33 such as "180 seconds or longer" and "from 120 seconds to less than 180 seconds," while "1" is correlated as the operation code 34 which indicates to reproduce at a double speed with the transmission periods 33 such as "from 60 seconds to less than 120 seconds" and "less than 60 seconds."

The reproduction control code memory part 12b includes the reproduction period table 36 as that shown in FIG. 14, for example. The reproduction period table 36 is structured to store transmission periods 37, in correlation with operation codes 38 representing reproduction periods 39. The transmission periods 37 are similar to the transmission periods 33. For example, "0" is correlated as the operation code 37 which indicates to reproduce for a regular period of time with the transmission periods 33 such as "180 seconds or longer" and "from 120 seconds to less than 180 seconds," while "2" is correlated as the operation code 38 which indicates to reproduce only for the first five seconds with the transmission periods 33 such as "from 60 seconds to less than 120 seconds" and "less than 60 seconds."

FIG. 15 is a view showing the relationship between command signals 40, which designate operations which are to be performed after a specific operation, such as inputting of a secret identification number by means of the DTMF signal, while the telephone answering machine 31 is automatically responding to a call on the telephone line network, and a corresponding operation content 41. For example, the first command 40 of "1#" is correlated with the operation content 41 for "START REPRODUCING," the second command 40 of "2#" is correlated with the operation content 41 for "RETURN TO REGULAR REPRODUCING," and the ninth command 40 of "9#" is correlated with the operation content 41 for "STOP REPRODUCING AND RECORDING."

Figure 16:
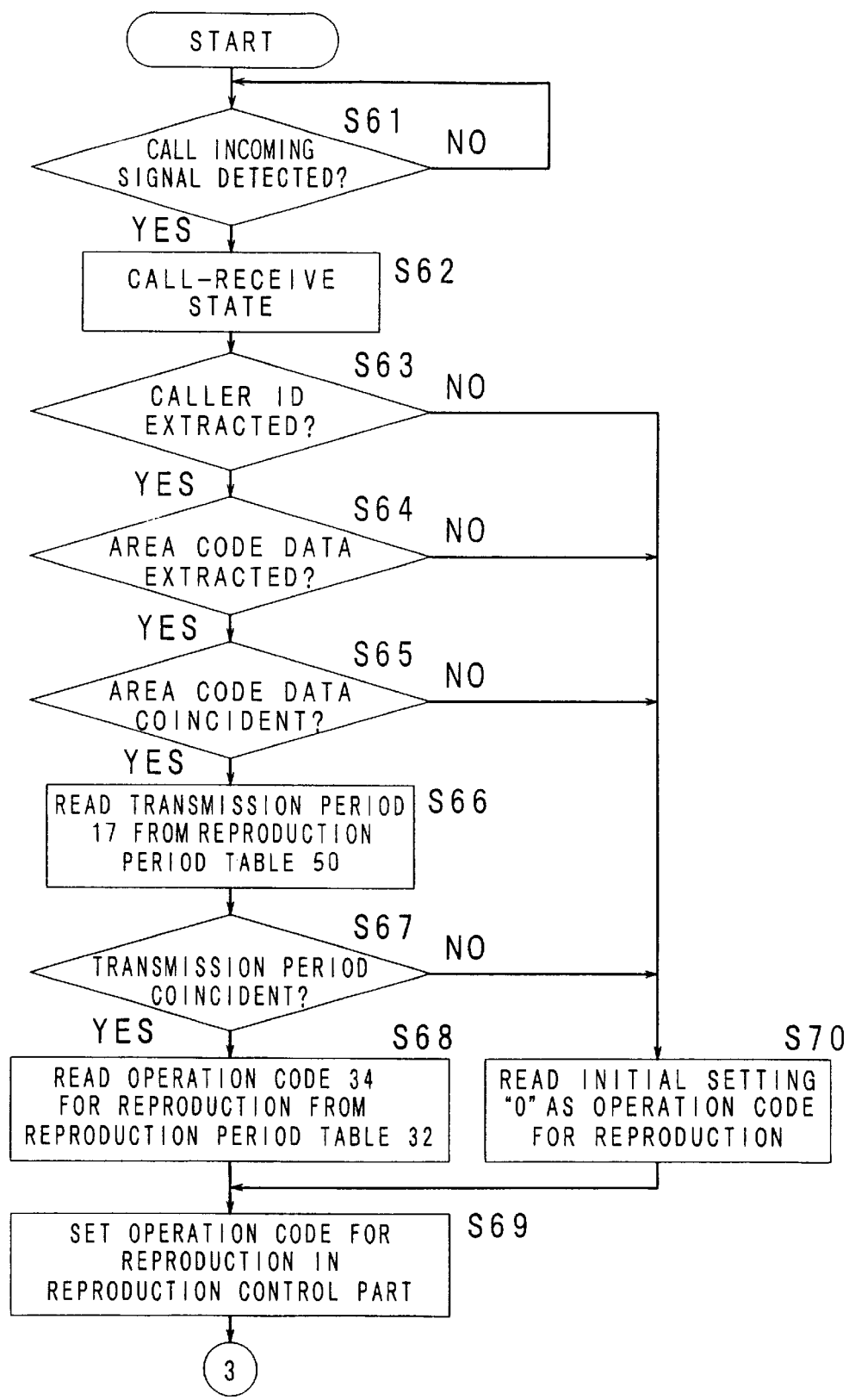
FIG. 16 is a flow chart showing an operation of reproducing a response message by the telephone answering machine 31, using the reproduction speed table 32.
Figure 17:
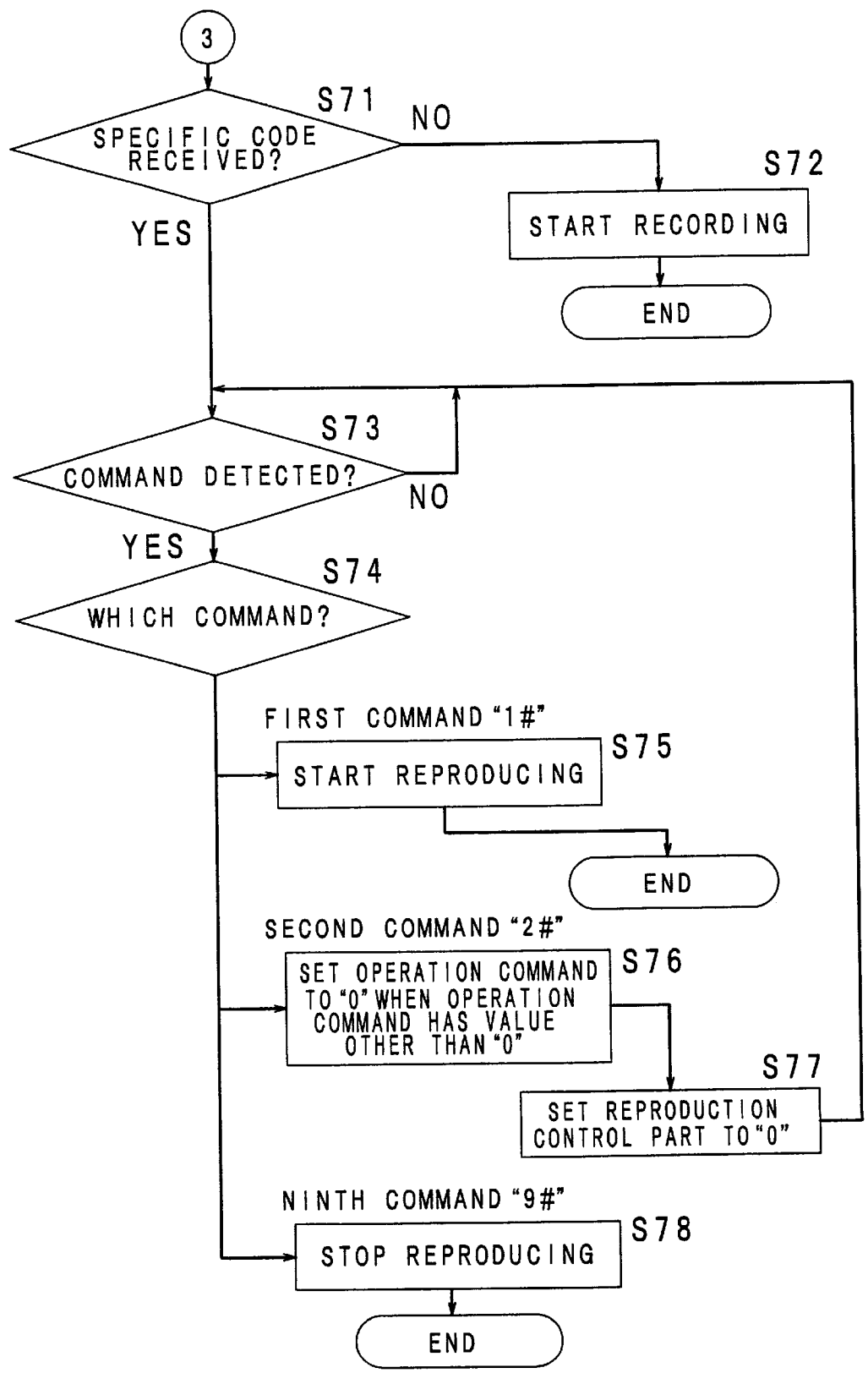
FIG. 17 is a flow chart showing an operation of reproduction a response message by the telephone answering machine 31, using the reproduction speed table 32.

FIGS. 16 and 17 are flow charts showing a reproduction operation, using the reproduction speed table 32, of reproducing a response message performed by the telephone answering machine 31 according to the fifth embodiment. At step S61, whether a call incoming signal is received is judged. When the call incoming signal is judged as being received, at step S62 the telephone answering machine 31 enters a call-receive state.

At step S63, the caller ID extracting part 6 analyzes the received call incoming signal and determines whether ID information regarding a caller is extracted. When the ID information is judged as being extracted, at step S64 the caller ID extracting part 6 further determines whether a caller's area code is extracted. At step S65 which is followed when the caller's area code is judged as being extracted, the ID checking part 7 checks the extracted caller's area code against the area codes 16 which are stored in the transmission period memory part 11, and judges whether the area codes match each other. If the area codes are judged as matching each other, the sequence proceeds to step S66. When at step S63 the ID information is judged as not being extracted, when at step S64 the caller's area code is judged as not being extracted, or when at step S65 the area codes are judged as not matching each other, the sequence proceeds to step S70.

At step S66, the transmission period reading part 8 reads the transmission period 17 which corresponds to the area code 16 judged as matching on the basis of a checking result of the ID checking part 7. At step S67, the transmission period checking part 9 checks the transmission period 17 which is read by the transmission period reading part 8 against the transmission periods 33 of the reproduction speed table 32 of the response message memory part 12b, and judges whether the transmission periods match each other. When the transmission periods are judged as not matching each other, at step S68 the operation code 34 representing the reproduction speed 35 for reproducing a response message which is correlated with the transmission period 33 is read. The operation code 34 which is read is supplied to the central control part 1. When the transmission periods are judged as not matching each other, the sequence proceeds to step S70. At step S70, "0" is read as the operation code 34 representing the reproduction speed 35 for reproducing a response message. The reproduction speed for reproducing the response message is selected as a predetermined regular speed.

At step S69 which is followed upon the operations at the steps S68, S70, the reproduction speed which is read is set in the reproduction control part 14. At step S71, the DTMF signal detecting part 24 detects a DTMF signal which is inputted on the telephone line network through the network control part 2, encodes the detected DTMF signal and supplies the same to the central control part 1, so that whether the encoded signal is a predetermined specific code is judged. When the encoded signal is judged as being the predetermined specific code, the sequence proceeds to step S73, to thereby shift to the remote operation mode.

When at the precedent step S71 the DTMF the encoded signal is judged as not being predetermined specific code, at step S72 the recording operation is started only for a predetermined period of time, whereby voice data are stored in the voice data memory part 5, that is, a voice signals which are inputted on the telephone line network through the network control part 2 are sequentially converted into voice data by the recording part 3 and sequentially stored in the voice data memory part 5. The recording operation is thereafter stopped, and the network control part 2 is actuated to cut off the telephone line network and end the communication.

At step S73 which is followed when the predetermined specific code is detected at step S71 and the remote operation mode has been invoked, whether the command signal 40 is detected is judged. When the command signal 40 is judged as being detected, at step S74 the type of the detected command signal 40 is judged.

When the command signal 40 is judged as being the first command signal of "1#," the sequence proceeds to step S75, whereby a reproduction operation which is similar to that of step S36 is started and the sequence is ended. When the command signal 40 is judged as being the second command signal of "2#," the sequence proceeds to step S76, whereby the operation code 34 is set at 0 if the operation code 34 has a value other than 0 and the sequence proceeds further to step S77 so as to set "0" which represents the regular reproduction speed in the reproduction control part 14. The sequence then returns to step S73. When the command signal 40 is judged as being the ninth command signal of "9#," the sequence proceeds to step S78, whereby if a reproduction operation is being executed, the reproduction operation is stopped, or if a reproduction operation is being executed, the reproduction operation is stopped, and the network control part 2 is thereafter actuated to cut off the telephone line network and end the communication.

Figure 18:
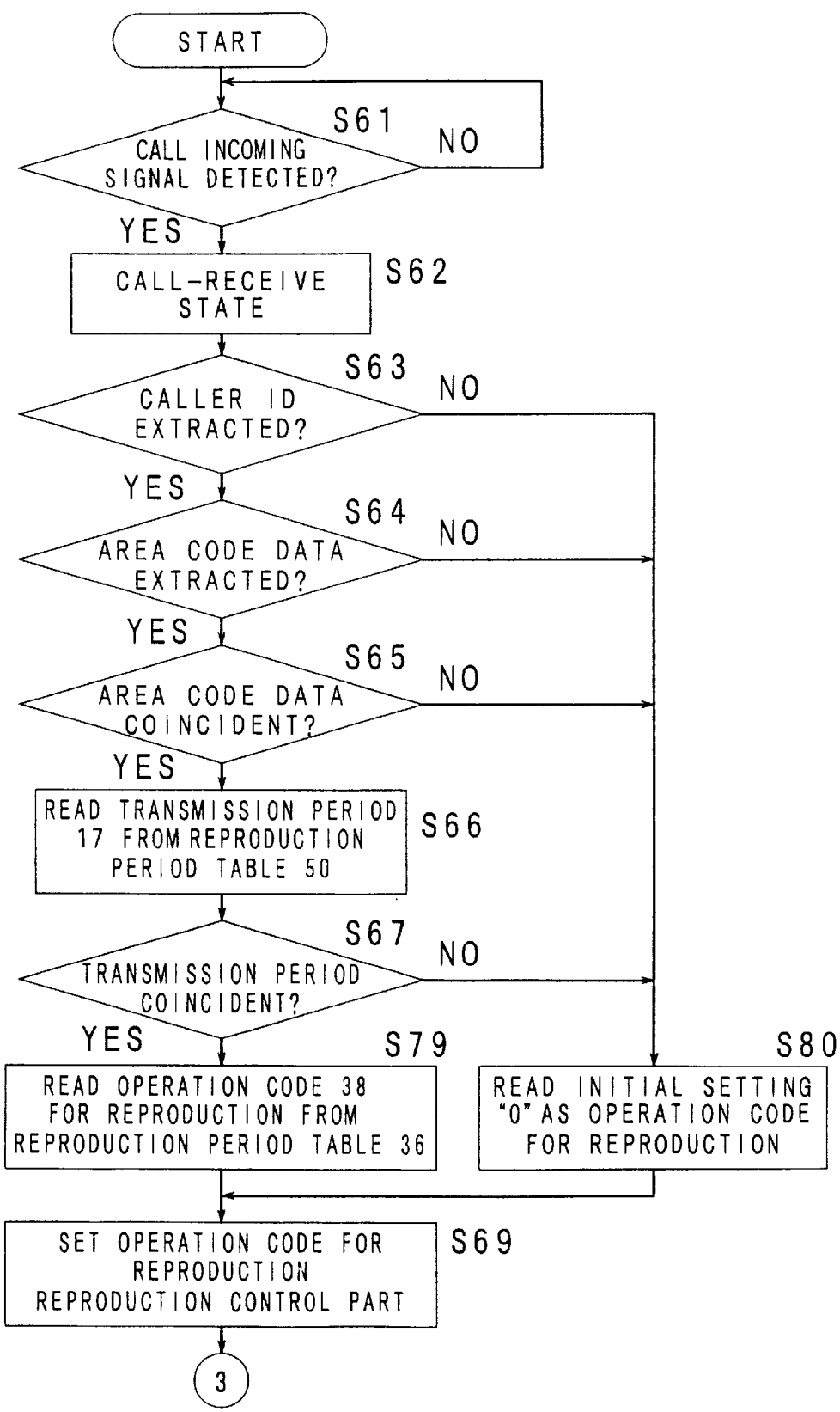
FIG. 18 is a flow chart showing an operation of reproducing a response message of the telephone answering machine 31, using the reproduction period table 36.

FIG. 18 is a flow chart showing an operation of reproducing a response message of the telephone answering machine 31 of the fifth embodiment, using the reproduction period table 36. In the flow chart, steps S79, S80 are added in place of the steps S68, S70 of the flow charts which are shown in FIGS. 16 and 17.

At step S67, the transmission period 17 which is read by the transmission period reading part 8 is checked against the transmission periods 37 of the reproduction period table 36 of the response message memory part 12b. When the transmission periods are judged as matching each other, the sequence proceeds to step S79. At step S79, the operation code 38 which represents the reproduction period 39 for reproducing a response message which corresponds to the transmission period 37 is read. The operation code 38 which is read is supplied to the central control part 1.

At step S67, the transmission period 17 which is read by the transmission period reading part 8 is checked against the transmission periods 37 of the reproduction period table 36 of the response message memory part 12b, and when the transmission periods are judged as not matching each other, the sequence proceeds to step S80. At step S80, "0" is read as the operation code 38 which represents the reproduction period 39 for reproducing a response message. As a result, the predetermined regular time period is selected as the reproduction period for reproducing a response message. That is, this is used as a time period which is needed to reproduce all response messages.

Upon the operations of the steps S79, S80, the operations of step S69 and the subsequent steps described earlier are executed.

As described above, according to the fifth embodiment, a response message is sent at a regular speed when a transmission period per unit charge is long, whereas when a transmission period per unit charge is short, a response message is sent at a speed which is twice faster or only for the first five seconds. Hence, it is possible to shorten a transmission period and reduce a call charge.

The reproduction speed for reproducing a response message for a short transmission period per unit charge is not limited to the speed which is twice faster, but rather may be any other speed which is faster than the regular speed. Further, the reproduction period for reproducing a response message is not limited the first five seconds, but may be any period of time which is shorter than a time period which is required to reproduce all response messages.

Figure 19:
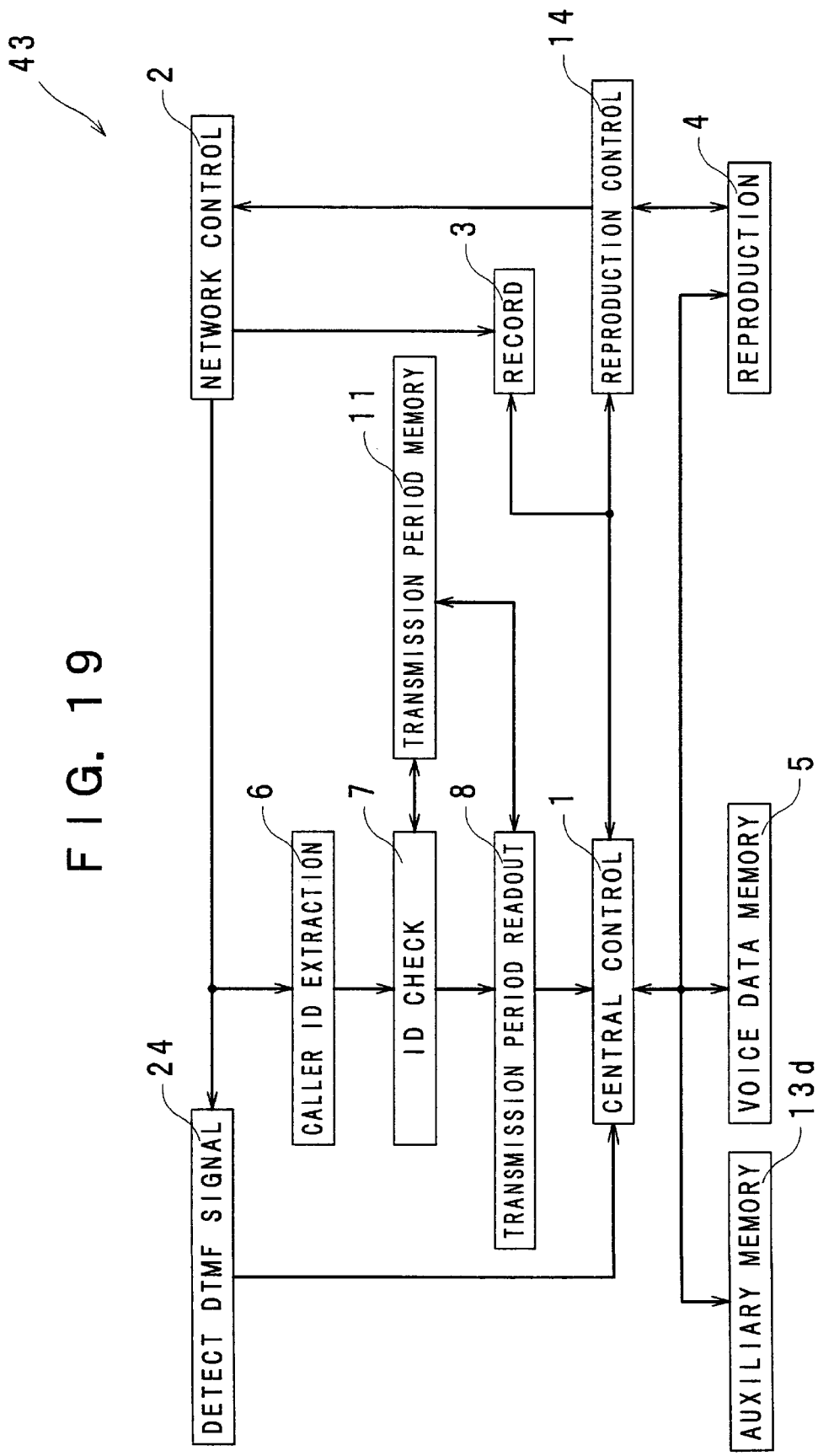
FIG. 19 is a block diagram showing the electric structure of a telephone answering machine 43 of a sixth embodiment of the invention.

FIG. 19 is a block diagram showing the electric structure of a telephone answering machine 43 of a sixth embodiment of the invention. The telephone answering machine 43 is structured like the telephone answering machine 15 described earlier, but is characterized by comprising the elements other than the transmission period checking part 9, the response message reading part 10a and the response message memory part 12a, and comprising the DTMF signal detecting part 24. The telephone answering machine 43 is also characterized in comprising an auxiliary memory part 13d in place of the auxiliary memory part 13a. The auxiliary memory part 13d is approximately similar in structure to the auxiliary memory part 13a, but further stores a predetermined reference transmission period.

Figure 20:
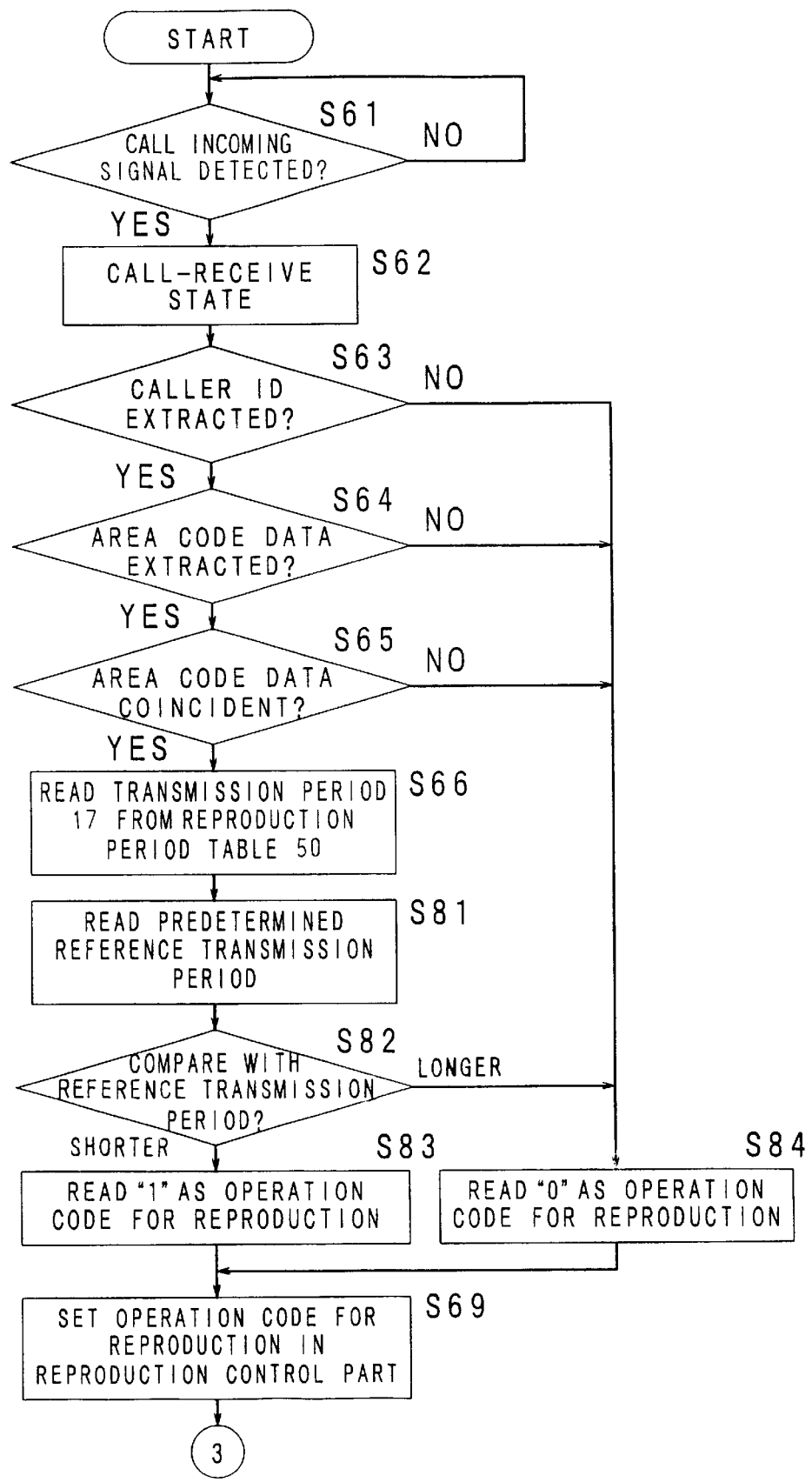
FIG. 20 is a flow chart showing an operation of reproducing a response message of the telephone answering machine 43.

FIG. 20 is a flow chart showing an operation of reproducing a response message of the telephone answering machine 43 of the sixth embodiment. In the flow chart, steps S81 to S84 are added in place of the steps S67, S68, S70 of the flow charts which are shown in FIGS. 16 and 17.

After the transmission period 17 is read by the transmission period reading part 8 at step S66, the sequence proceeds to step S81. At step S81, the reference transmission period which is stored in the auxiliary memory part 13d is read. At step S82, the transmission periods are compared with each other. When the reference transmission period is judged as being shorter than the transmission period 17, the sequence proceeds to step S83. When the reference transmission period is judged as being longer than the transmission period 17, the sequence proceeds to step S84. At step S83, 1 is selected as the operation code, so as to quicken the reproduction period for reproducing a response message twice faster. At step S84, 0 is selected as the operation code, so that the regular speed is selected as the reproduction period for reproducing a response message. Upon the operations of the steps S83, S84, the operations of step S69 and the subsequent steps described earlier are executed.

Figure 21:
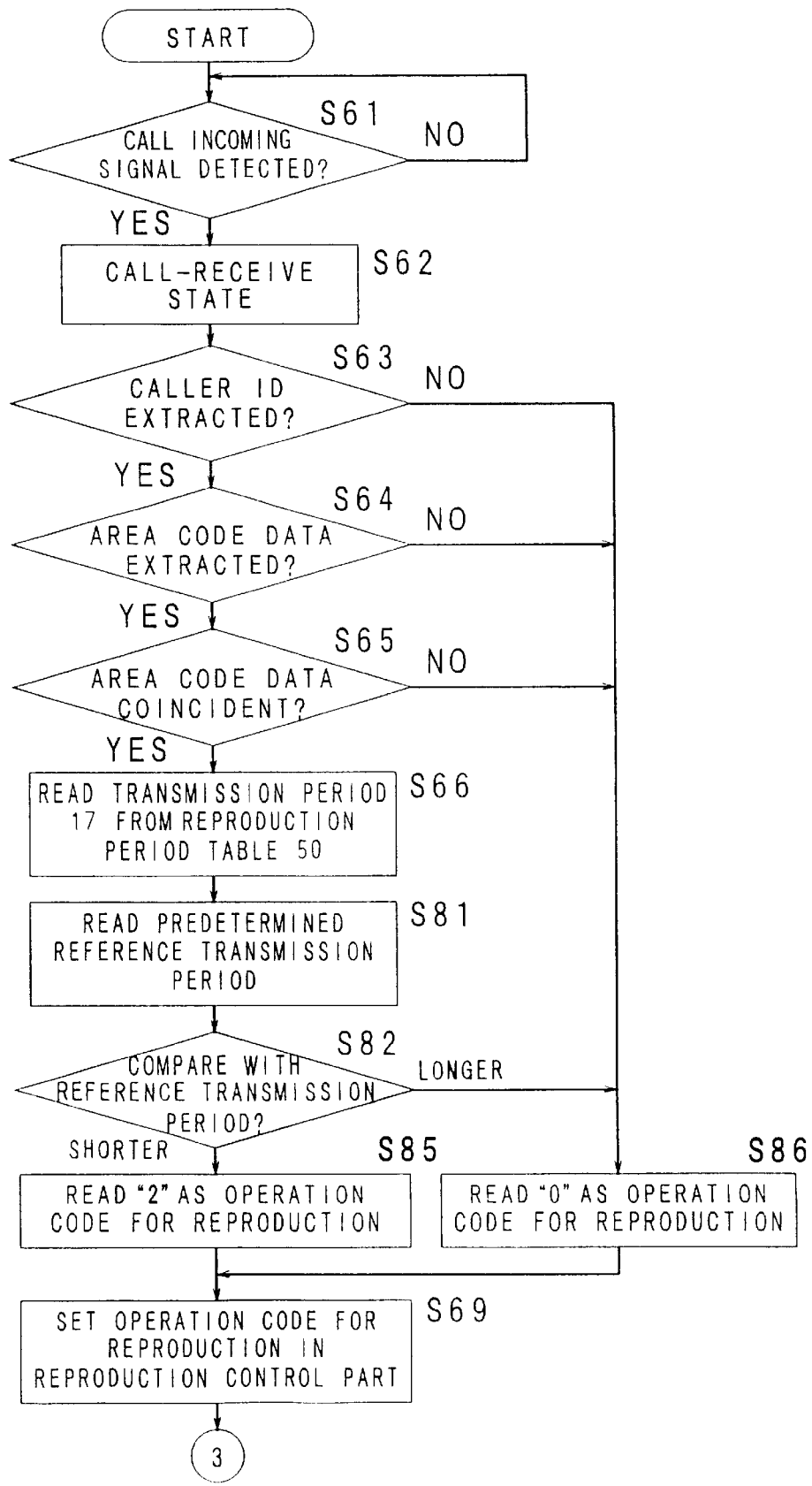
FIG. 21 is a flow chart showing another operation of reproducing a response message of the telephone answering machine 43.

FIG. 21 is a flow chart showing another operation of reproducing a response message of the telephone answering machine 43 of the sixth embodiment. In the flow chart, steps S85, S86 are added in place of the steps S83, S84 of the flow chart which is shown in FIG. 20.

At step S82, the transmission periods are compared with each other. When the reference transmission period is judged as being shorter than the transmission period 17, the sequence proceeds to step S85. When the reference transmission period is judged as being longer than the transmission period 17, the sequence proceeds to step S86. At step S85, 2 is selected as the operation code, so as to reproduce a response message only for the first five seconds. At step S86, 0 is selected as the operation code, so as to reproduce a response message only for the regular period of time. Upon the operations of the steps S85, S86, the operations of step S69 and the subsequent steps described earlier are executed.

As described above, according to the sixth embodiment, having a simple structure which does not use the response message reading part 10, the response message memory part 12a and the like, the telephone answering machine 43 shortens a transmission period and reduces a call charge.

In this embodiment as well, the reproduction speed for reproducing a response message for a short transmission period per unit charge is not limited to the speed which is twice faster, but rather may be any other speed which is faster than the regular speed. Further, the reproduction period for reproducing a response message is not limited the first five seconds, but may be any period of time which is shorter than a time period which is required to reproduce all response messages.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A telephone answering machine comprising:
   first memory means for storing caller ID information and transmission periods per unit call charge in money in correlation to each other;
   second memory means for storing the transmission periods and response messages in correlation to each other in such a manner that the response messages become longer as the transmission periods are longer;
   receiving means for receiving a call incoming signal from a telephone line network;
   extracting means for analyzing the call incoming signal to extract caller ID information;
   ID information checking means for checking the extracted caller ID information against the caller ID information stored in the first memory means;
   transmission period reading means for reading a transmission period correlated with a caller ID information judged as matching on the basis of a checking result of the ID information checking means, from the first memory means;
   transmission period checking means for checking the read transmission period against the transmission periods stored in the second memory means;
   response message reading means for reading a response message correlated with a transmission period judged as matching on the basis of a checking result of the transmission period checking means, from the second memory means;
   reproducing means for reproducing the read response message as a voice signal; and
   sending means for sending the voice signal to the telephone line network.

2. The telephone answering machine of claim 1, further comprising:
   third memory means for storing a predetermined reference transmission period;
   comparing means for comparing the transmission period read by the transmission period reading means with the reference transmission period stored in the third memory means; and
   controlling means for controlling the sending means, in accordance with a comparison result of the comparing means, to output a response message to the telephone line network when the transmission period read by the transmission period reading means is longer than the reference transmission period, and to output no response message to the telephone line network when the transmission period read by the transmission period reading means is shorter than the reference transmission period.

3. The telephone answering machine of claim 1, further comprising:
   third memory means for storing a predetermined reference transmission period;
   comparing means for comparing the transmission period read by the transmission period reading means with the reference transmission period stored in the third memory means; and
   controlling means for controlling the reproducing means, in accordance with a comparison result of the comparing means, to reproduce a response message into a voice signal at a predetermined reference speed and output the response message to the telephone line network when the transmission period read by the transmission period reading means is longer than the reference transmission period, and to reproduce a response message into a voice signal at a speed faster than the predetermined reference speed and output the response message to the telephone line network when the transmission period read by the transmission period reading means is shorter than the reference transmission period.

4. A telephone answering machine in which a voice signal inputted from a telephone line network is recorded by voice recording means as a caller's message from the caller and is stored in voice information memory means, and a response message stored in advance in the voice information memory means is reproduced by voice reproducing means into a voice signal and outputted to the telephone line network, the telephone answering machine comprising:
   memory means for storing ID select conditions associated with at least transmission periods per unit call charge in money and operation codes in correlation with each other,
   the ID select conditions being correlated with caller ID information,
   the operation codes representing a recording operation and a reproducing operation which are executed by the telephone answering machine;
   receiving means for receiving a call connecting signal from the telephone line network;

extracting means for analyzing the call connecting signal and extracting caller ID information;

ID information checking means for checking the extracted caller ID information against ID information stored in the memory means;

operation code reading means for reading an operation code associated with an ID select condition correlated with a caller ID information judged as matching on the basis of a checking result of the ID information checking means, from the memory means; and controlling means for causing the voice recording means and the voice reproducing means to execute an operation corresponding to the read operation code.

5. The telephone answering machine of claim 4, wherein operation codes associated with ID select conditions include operation codes for instructing a remote control mode.

6. A telephone answering machine in which a response message stored in advance in voice information memory means is reproduced into a voice signal by voice reproducing means, and outputted to a telephone line network, the telephone answering machine comprising:

first memory means for storing ID select conditions associated with caller ID information and transmission periods per unit call charge in money in correlation to each other;

second memory means for storing said transmission periods and reproduction speed control codes representing reproduction speeds for reproducing response messages, in correlation to each other;

receiving means for receiving a call connecting signal and a DTMF signal from the telephone line network;

extracting means for analyzing said call incoming signal and extracting caller ID information;

ID information checking means for checking the extracted caller ID information against the caller ID information stored in said first memory means;

transmission period reading means for reading out a transmission period correlated with a caller ID information judged as matching on the basis of a checking result of the ID information checking means, from said first memory means;

transmission period checking means for checking the read transmission period against the transmission periods stored in the second memory means;

reproduction speed control code reading means for reading a reproduction speed control code correlated with a transmission period judged as matching on the basis of a checking result of the transmission period checking means, from the second memory means; and controlling means for driving the voice reproducing means to reproduce a response message as a voice signal at a speed corresponding to the read reproduction speed control code.

7. The telephone answering machine of claim 6, wherein the receiving means for receiving a call incoming signal receives a DTMF signal, the telephone answering machine further comprising:

judging means for comparing the DTMF signal to a predetermined amount; and mode shifting means for shifting operation to a remote operation mode.

8. A telephone answering machine in which a response message stored in advance in voice information memory means is reproduced as a voice signal by voice reproducing means, and is outputted to a telephone line network, the telephone answering machine comprising:

first memory means for storing ID select conditions associated with caller ID information and transmission periods per unit call charge in money in correlation to each other;

second memory means for storing the transmission periods and reproduction period control codes representing reproduction periods for reproducing response messages, in correlation to each other;

receiving means for receiving a call connecting signal;

extracting means for analyzing the call connecting signal and extracting caller ID information;

ID information checking means for checking the extracted caller ID information against the caller ID information stored in the first memory means;

transmission period reading means for reading a transmission period correlated with a caller ID information judged as matching on the basis of a checking result of the ID information checking means, from the first memory means;

transmission period checking means for checking the read transmission period against the transmission periods stored in the second memory means;

reproduction period control code reading means for reading a reproduction period control code correlated with a transmission period judged as matching on the basis of a checking result of the transmission period checking means, from the second memory means; and controlling means for driving the voice reproducing means to reproduce a response message as a voice signal for a period of time according to the read reproduction period control code.

9. The telephone answering machine of claim 8, wherein the receiving means for receiving a call incoming signal receives a DTMF signal, the telephone answering machine further comprising:

judging means for comparing the DTMF signal to a predetermined amount; and mode shifting means for shifting operation to a remote operation mode.

10. An answering machine comprising:

an extraction part that extracts caller ID information from a received call connecting signal propagating from an external source;

an analysis part that determines operation based on the caller ID information, said analysis part including a transmission period part that provides a transmission period per unit call charge in money as the operation; and a control part that controls the execution of the operation between the answering machine and an external network based on the caller ID information.

11. The answering machine of claim 10, wherein the caller ID information includes an area code of the external source.

12. The answering machine of claim 10, wherein the caller ID information includes a telephone number of the external source.

13. The answering machine of claim 10, wherein the control part further includes:

a central control part for comparing the transmission period per unit charge to a predetermined transmission period per unit charge;

a recording part for recording a caller message based on the comparison; and a reproduction part for outputting a response message based on the comparison.

14. The answering machine of claim 10, further comprising:
- a reproduction control part that determines one of a reproducing speed and a reproducing period based on the transmission period per unit charge.

15. The answering machine of claim 10, wherein the analyzing part includes:
- a response message part that provides a response message to be output to the external network as the operation.

16. The answering machine of claim 10, wherein the analyzing part determines an operation that includes one of reproducing and outputting a response message, recording a caller message, and shifting to a remote operation mode.

17. The answering machine of claim 10, wherein the extraction part extracts caller ID information from a received dual-tone multifrequency signal.

* * * * *